Nov. 12, 1968  M. M. ANDERSON  3,411,070
SUBSURFACE SURVEYING APPARATUS AND METHOD USING
A COMPOSITE ELECTRO-MAGNETIC ENERGY WAVE
Filed Oct. 15, 1965
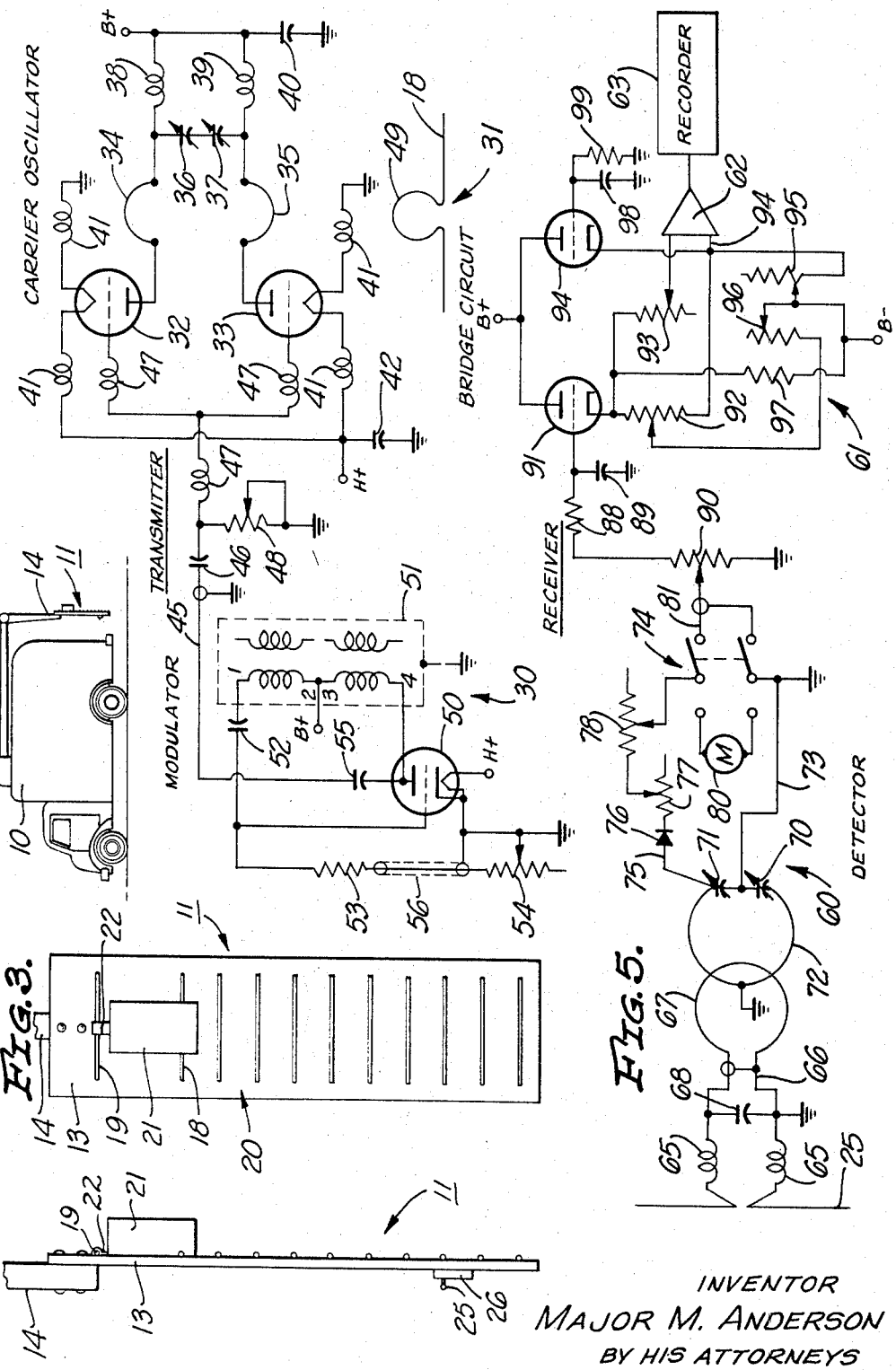
INVENTOR
MAJOR M. ANDERSON
BY HIS ATTORNEYS
HARRIS, KIECH, RUSSELL & KERN

United States Patent Office 3,411,070
Patented Nov. 12, 1968

3,411,070
SUBSURFACE SURVEYING APPARATUS AND METHOD USING A COMPOSITE ELECTROMAGNETIC ENERGY WAVE
Major M. Anderson, Santa Ana, Calif., assignor to Subsurface Surveys, Santa Ana, Calif., a corporation of California
Filed Oct. 15, 1965, Ser. No. 496,268
11 Claims. (Cl. 324—.5)

ABSTRACT OF THE DISCLOSURE

Apparatus and method for detecting subterranean deposits, such as oil. A transmitter providing an output comprising a carrier wave of a frequency which is a harmonic of the magnetic resonance frequency of an atom of the material sought and modulated at a frequency which is a submultiple of the magnetic resonance frequency. A receiver for the transmitted signal, with the receiver output varying as the field strength of the signal and with change in the signal strength indicating presence of the material sought.

---

This invention relates to prospecting and, in particular, to new and improved equipment and methods for detecting subterranean deposits of selected materials.

The equipment of the invention includes a radio frequency transmitter and receiver carried by a vehicle, such as a truck or boat, for movement along the surface of the earth. The transmitter produces an electromagnetic wave with particular characteristics with the wave being directed into the earth as the vehicle moves along the surface. Variations in field strength are detected by the receiver and are recorded as a function of position of the vehicle as it moves along a path. The field strength at the receiver may be directly correlated with the subsurface presence or absence of the selected material so that the recorded output can be used in the nature of a map of the subsurface conditions.

The invention is suitable for use in the detection of hydrocarbons such as oil or gas both under land and under water, the detection of various metals and other elements, and the detection of bodies of water under land.

It is an object of the invention to provide an apparatus for detecting subterranean deposits of a selected material and including a vehicle for moving along the surface of the earth, a transmitter carried by the vehicle and including means for generating a composite electromagnetic energy wave comprising a carrier wave of a frequency which is a harmonic of the magnetic resonance frequency of an atom of the material and modulated at a frequency which is a submultiple of the magnetic resonance frequency, a transmitting antenna fed by the transmitter and carried by the vehicle and arranged for directing the transmitter wave into the earth, a receiving antenna carried by the vehicle, and a receiver fed by the receiving antenna and including means for converting the received radio frequency signal to a D.C. signal for recording.

It is an object of the invention to provide such an apparatus including a new and improved receiver incorporating a crystal detector and a bridge circuit for greater stability and sensitivity. A further object is to provide such an apparatus including new and unique transmitting and receiving antenna systems. A further object is to provide such an apparatus incorporating a transmitter comprising a tuned oscillator for providing the carrier frequency and modulator for providing the specific modulation of the carrier to produce the desired composite wave.

It is an object of the invention to provide a new and improved method for detecting subterranean deposits of a selected material and including the steps of propagating into the earth an electromagnetic energy wave having the prescribed characteristics, moving the source of the wave along a path substantially parallel to the surface of the earth, and measuring the field strength of the wave at a controlled point with respect to the source of the wave as the source is moved.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:
FIG. 1 is a side view of the apparatus of the invention incorporated in a truck;
FIG. 2 is an enlarged view of the antenna portion of the apparatus of FIG. 1;
FIG. 3 is a rear view of the antenna system of FIG. 2;
FIG. 4 is a schematic diagram of a preferred form of transmitter circuit; and
FIG. 5 is a schematic diagram of a perferred form of receiver circuit.

In the preferred embodiment of the invention illustrated herein, the transmitter and receiver are carried in a truck 10. The antenna structures, indicated generally at 11, preferably are mounted on an extensible boom 12 for positioning in a controlled location behind the truck. The boom may be retractable to position the antenna structure on top of the truck when the equipment is not in use. The particular type of vehicle utilized in moving the equipment along the surface of the earth is not critical and, of course, when surveying over water, a boat of some type would be utilized. The antenna structure may be provided with a protective housing if desired, but none is shown in the drawing.

The antenna structure 11 is shown in greater detail in FIGS. 2 and 3 wherein the antenna elements are mounted on a dielectric base 13 carried at the end 14 of the boom 12. In the preferred form, the transmitting antenna is a yagi array including a driven element 18, a reflector element 19, and a plurality of director elements 20. The high frequency portion of the transmitter may be mounted directly at the antenna, as indicated at 21, with the driven antenna 18 directly coupled into the transmitter. The antenna elements may comprise metal rods which are fixed directly to the base 13 by suitable means such as screws. A ground strap 22 provides for connecting the reflector element to circuit ground.

The receiving antenna, normally a single dipole 25, may be mounted on the base 13 on an insulating housing 26 to provide a controlled relation with the transmitting antenna. Some of the circuitry of the receiver may be disposed in the housing 26.

A preferred circuit for the transmitter is shown in FIG. 4 and includes a modulator oscillator 30 and a carrier frequency oscillator 31. The carrier oscillator 31 is an inductance-capacitance tuned oscillator utilizing a pair of triodes, typically 3C24 tubes 32, 33, inductance loops 34, 35, and variable capacitors 36, 37. The plate voltage supply circuit utilizes radio frequency chokes 38, 39 and a capacitor 40. The cathode heater supply utilizes four radio frequency chokes 41 and capacitor 42. The output from the modulator 30 is connected via line 45, capacitor 46 and three radio frequency chokes 47 to the grids of the tubes 32, 33. A variable resistor 48 provides for control of the degree of modulation. The driven antenna element 18 is a dipole with a coupling loop 49 positioned for inductive coupling with the inductances 34, 35.

The modulator 30 is an oscillator incorporating a triode tube 50, the primary winding of a transformer 51 and a capacitor 52 for the plate-to-grid coupling, and a fixed resistor 53 and a variable resistor 54 for the grid-to-cathode coupling. The variable resistor 54 provides for control of the frequency and the output is connected to line 45 via another capacitor 55.

In the preferred installation, the carrier oscillator 31 is mounted directly on the antenna base and the modulator is mounted within the vehicle, with the line 45 comprising a coaxial cable.

In one specific embodiment, the modulator frequency is variable over the range of about 100 to 200 kilocycles per second with the tube 50 being a Type 955, the transformer 51 a Thordarson T20A25, the capacitor 52 .00025 microfarad, the resistor 53 68 kohms and the resistor 54 5 megohms. The resistor 54 may be remotely located for access for adjustment and may be connected into the circuit via a shielded cable 56.

Turning now to FIG. 5, the receiver includes the antenna 25, a detector 60, a bridge circuit 61, an amplifier 62 and a recorder 63.

The receiving antenna structure is a dipole and is connected via two radio frequency chokes 65 and a length of coaxial cable 66 to a coupling loop 67. A capacitor 68 of about .001 microfarad may be connected across the line at the input to the coaxial line.

Variable capacitors 70, 71 are connected in the second coupling loop 72, with one output line 73 going directly to the moving arm of a double pole double throw switch 74 and with the other output line 75 connected to the switch 74 through a diode 76 and variable resistors 77, 78.

With the switch 74 thrown to the left, a meter 80 is connected across the output of the detector providing a visual indication for testing and tuning. With the switch 74 thrown to the right, the detector output is connected to the bridge circuit 61 via another coaxial line 81.

A potentiometer 90 serves as a sensitivity control for the input to the bridge circuit which includes a triode 91 operated as a cathode follower. The potentiometer 90 is connected to the grid of the tube 91 through a resistor 88, with a shunt capacitor 89 connected to circuit ground. The bridge circuit output is developed across potentiometer 92 and is connected as an input to the amplifier 62 through a variable resistor 93. The cathode of the triode 91 is connected to B— through resistor 97. The arm of the potentiometer 92 is connected to B— through variable resistor 96. A second triode 94 has its plate connected to B+ and its cathode connected to B— through variable resistor 95. The grid of the triode 94 is connected to circuit ground through a capacitor 98 and a resistor 99 in parallel. The output from the bridge circuit provides the input to the amplifier 62 which in turn drives the recorder 63.

In the operation of the bridge circuit, the potentiometer 90 is used as a sensitivity control or input attenuator and the variable resistor 96 permits adjusting the cathode voltage of the tube 91. Similarly the variable resistor 95 permits adjustment of the cathode voltage of the tube 94. The potentiometer 92 is used to adjust the zero setting of the output and the variable resistor 93 provides a control of the D.C. balance of the output.

In one specific form, the components of the bridge circuit have the following values:

Tube 91 _____ ½ 12AU7
Tube 94 _____ ½ 12AU7
Resistance 88 _____megohms__ 3.3
Resistance 90 _____kohms__ 500
Resistance 92 _____do____ 10
Resistance 93 _____do____ 10
Resistance 95 _____do____ 500
Resistance 96 _____do____ 250
Resistance 97 _____do____ 100
Capacitance 89 _____mfd__ .001
Capacitance 98 _____do____ .001

In operation, the output of the system is adjusted to provide a particular indication at the recorder, typically a zero indication. Then the vehicle is driven across the area to be surveyed. Increases in output indicate subterranean presence of the selected material at the instant location of the vehicle. Of course, it is essential that the transmitting antenna be disposed as nearly perpendicular as possible and that the antenna beam be exceedingly narrow in order to eliminate or reduce geometrical errors in location.

The oscillator 31 generates a carrier frequency which is modulated with a second frequency providing what is sometimes referred to as a composite electromagnetic energy wave. The theory of operation of the apparatus is described herein as it is presently understood. The purpose of the carrier wave is to establish a window or low loss transmission line into the earth. The modulation frequency is selected as a submultiple of the magnetic resonance frequency of an atom of the material of interest. This permits the system to be selective of the element or material under investigation. In operation, both the carrier frequency and the modulation are continuous in nature. The modulation frequency preferably is selected within the range of about 100 to about 200 kilocycles per second.

It being the nature of atoms to accept additional energy, above their normal level, when that accepted energy is at the magnetic resonance frequency of the particular atom. Such energy is emitted at the frequency of the energized atom, regardless of the amount of energy absorbed. This characteristic of atomic absorption varies the load upon the source of the generated signal, in a manner to "absorption modulate" the immediate field of excitation surrounding the transmitting antenna.

It has been discovered that by modulating the carrier frequency with a frequency related to the magnetic resonance frequency the carrier frequency establishes a suitable transmission line into the earth along which the modulated signal can be transmitted to subterranean deposits. This acceptance of energy, tantamount to absorption, reflects a varying load to the transmission line resulting in an increase and decrease of intensity of the field surrounding the transmitting antenna. It appears that the field change is in direct proportion to the quantity or mass of the subterranean material.

It has also been discovered that the carrier frequency should be a harmonic of the magnetic resonance frequency of the selected atom in order to obtain the desired operation and preferably should be a frequency in the order of 100 to 200 megacycles per second. It has been found that best results are obtained with a carrier frequency in the range of about 190 to about 215 megacycles per second.

The system may be utilized in exploring for hydrocarbons such as oil and gas, utilizing the magnetic resonance frequency of the carbon 13 atom which is 10.705 megacycles per second. In the specific embodiment illustrated herein, the carrier frequency is made an 18th harmonic or 192.690 megacycles per second and the modulation frequency is made a ¹⁄₆₄ multiple or 167.25 kilocycles per second. The various component values and dimensions given in the specification are for this particular embodiment but it is understood that other frequencies of operation and other materials can be utilized.

Examples of other elements and preferred operating frequencies are given in Table I.

TABLE I

| Element | Magnetic Resonance Frequency (megacycles/ second) | Carrier Frequency (megacycles/ second) | Modulation Frequency (kilocycles/ second) |
| --- | --- | --- | --- |
| Hydrogen | 42.577 | 212.885 | 166.316 |
| Silver | 1.722 | 192.864 | 114.800 |
| Lead | 8.899 | 195.778 | 102.287 |
| Copper | 11.285 | 191.845 | 125.399 |
| Helium | 42.434 | 212.170 | 101.033 |

In the construction and operation of the transmitter of FIG. 4, the components are preferably selected to provide a frequency of about 193 megacycles with the tuning capacitors open so that only a slight meshing of the condenser plates will be required to provide the desired frequency. It is desirable to select the tubes 32, 33 as a balanced pair with a plate current differential of not more than about 10 milliamperes. In the specific transmitting antenna utilized, each of the elements is 25½ inches in length, with the reflector element 19 spaced 23¼ inches from the driven element 18 and with each of the nine director elements 20 spaced 10¾ inches apart. The antenna itself is spaced about 36 inches from the rear of the vehicle with the lowermost element about 26 inches from the surface over which the antenna is positioned.

The receiving antenna 25 is fixed with respect to the transmitting antenna so that relative motion between the two cannot occur to introduce false indications. The receiving antenna position is selected to provide an optimum response and preferably is spaced horizontally from the transmitting antenna ¼ wave length of the carrier frequency and in line with the seventh of the nine director elements.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an apparatus for detecting subterranean deposits of a material, the combination of:
   a vehicle for moving along the surface of the earth;
   a transmitter carried by said vehicle, said transmitter including means for generating a composite electromagnetic energy wave comprising a carrier wave of a frequency which is a harmonic of the magnetic resonance frequency of an atom of said material and modulated at a frequency which is a submultiple of the magnetic resonance frequency;
   a transmitting antenna fed by said transmitter and carried by said vehicle and arranged for directing the transmitter wave into the earth;
   a receiving antenna carried by said vehicle; and
   a receiver fed by said receiving antenna, said receiver including means for converting the received radio frequency signal to a signal for recording.

2. In an apparatus for detecting subterranean deposits of a material, the combination of:
   a vehicle for moving along the surface of the earth;
   a transmitter carried by said vehicle, said transmitter including means for generating a composite electromagnetic energy wave comprising a carrier wave of a frequency which is a harmonic of the magnetic resonance frequency of an atom of said material and modulated at a frequency which is a submultiple of the magnetic resonance frequency;
   a transmitting antenna fed by said transmitter and carried by said vehicle and arranged for directing the transmitter wave into the earth;
   a receiving antenna carried by said vehicle; and
   a receiver having a crystal detector fed by said receiving antenna for converting the received radio frequency signal to a D.C. signal and a bridge circuit providing an output varying as a function of the received radio frequency signal,
   said bridge circuit including first and second cathode follower circuits connected in parallel, with the detector output connected as an input to one of said cathode follower circuits, and with the bridge circuit output appearing across a resistance connected between the cathode elements of said follower circuits.

3. In an apparatus for detecting subterranean deposits of a material, the combination of:
   a vehicle for moving along the surface of the earth;
   a transmitter carried by said vehicle, said transmitter including means for generating a composite electromagnetic energy wave comprising a carrier wave of a frequency which is a harmonic of the magnetic resonance frequency of an atom of said material and modulated at a frequency which is a submultiple of the magnetic resonance frequency;
   a transmitting antenna carried by said vehicle and comprising a yagi array disposed vertically and spaced from said vehicle above the earth for directing the transmitter wave into the earth;
   a receiving antenna carried by said vehicle in fixed spaced relation with said transmitting antenna; and
   a receiver fed by said receiving antenna, said receiver including means for converting the received radio frequency signal to a signal for recording.

4. In an apparatus for detecting subterranean deposits of a material, the combination of:
   a vehicle for moving along the surface of the earth;
   a transmitter carried by said vehicle and including an inductance-capacitance tuned oscillator providing a carrier wave of a frequency which is a harmonic of the magnetic resonance frequency of an atom of said material;
   a modulator comprising another oscillator running at a frequency which is a submultiple of the magnetic resonance frequency for modulating said carrier wave to provide a transmitter composite electromagnetic energy wave;
   a transmitting antenna fed by said transmitter and carried by said vehicle and arranged for directing the transmitter wave into the earth;
   a receiving antenna carried by said vehicle; and
   a receiver fed by said receiving antenna, said receiver including means for converting the received radio frequency signal to a signal for recording.

5. In an apparatus for detecting subterranean hydrocarbon deposits, the combination of:
   a vehicle for moving along the surface of the earth;
   a transmitter carried by said vehicle, said transmitter including means for generating a composite electromagnetic energy wave comprising a carrier wave at about 192.690 megacycles per second and modulated at about 167.25 kilocycles per second;
   a transmitting antenna fed by said transmitter and carried by said vehicle and arranged for directing the transmitter wave into the earth;
   a receiving antenna carried by said vehicle; and
   a receiver fed by said receiving antenna, said receiver including means for converting the received radio frequency signal to a signal for recording.

6. In an apparatus for detecting subterranean deposits of a material, the combination of:
   a vehicle for moving along the surface of the earth;
   a transmitter carried by said vehicle and including an inductance-capacitance tuned oscillator providing a carrier wave of a frequency which is a harmonic of the magnetic resonance frequency of an atom of said material;
   a modular comprising another oscillator running at a frequency which is a submultiple of the magnetic resonance frequency for modulating said carrier wave to provide a transmitter composite electromagnetic energy wave;
   a transmitting antenna carried by said vehicle and comprising a yagi array disposed vertically and spaced from said vehicle above the earth for directing the transmitter wave into the earth;
   a receiving antenna carried by said vehicle in fixed spaced relation with said transmitting antenna; and
   a receiver having a crystal detector fed by said receiving antenna for converting the received radio frequency signal to a D.C. signal and a bridge circuit providing an output varying as a function of the received radio frequency signal;

said bridge circuit including first and second cathode follower circuits connected in parallel, with the detector output connected as an input to one of said cathode follower circuits, and with the bridge circuit output appearing across a resistance connected between the cathode elements of said follower circuits.

7. In an apparatus for detecting subterranean deposits of a material, the combination of:

a vehicle for moving along the surface of the earth;

a transmitter carried by said vehicle, said transmitter including means for generating a composite electromagnetic energy wave comprising a carrier wave of a frequency which is a harmonic of the magnetic resonance frequency of an atom of said material and in the range of about 190 to 215 megacycles per second and modulated at a frequency which is a submultiple of the magnetic resonance frequency and in the range of about 100 to 200 kilocycles per second;

a transmitting antenna carried by said vehicle and spaced from said vehicle and above the earth for directing the transmitter wave into the earth;

a receiving antenna carried by said vehicle in fixed spaced relation with said transmitting antenna; and a receiver fed by said receiving antenna, said receiver including means for converting the received radio frequency signal to a signal for recording.

8. A method for detecting subterranean deposits of a selected material, including the steps of:

propagating into the earth an electromagnetic energy wave comprising a carrier wave of a frequency which is a harmonic of the magnetic resonance frequency of an atom of the selected material and modulated at a frequency which is a submultiple of the magnetic resonance frequency;

moving the source of the wave along a path substantially parallel to the surface of the earth; and measuring the change in field strength of the wave at a controlled point with respect to the source of the wave as the source is moved.

9. A method for detecting subterranean hydrocarbon deposits, including the steps of:

propagating into the earth an electromagnetic energy wave comprising a carrier wave at about 192.690 megacycles per second and modulated at about 167.25 kilocycles per second;

moving the source of the wave along a path substantially parallel to the surface of the earth; and measuring the change in field strength of the wave at a controlled point with respect to the source of the wave as the source is moved.

10. A method for detecting substerranean deposits of a selected material, including the steps of:

propagating into the earth an electromagnetic energy wave comprising a carrier wave of a frequency which is a harmonic of the magnetic resonance frequency of an atom of the selected material and in the range of about 190 to 215 megacycles per second and modulated at a frequency which is a submultiple of the magnetic resonance frequency and in the range of about 100 to 200 kilocycles per second;

moving the source of the wave along a path substantially parallel to the surface of the earth; and measuring the change in field strength of the wave at a controlled point with respect to the source of the wave as the source is moved.

11. In an apparatus for detecting subterranean deposits of a material, the combination of:

a portable housing;

a transmitter carried by said housing, said transmitter including means for generating a composite electromagnetic energy wave comprising a carrier wave of a frequency which is a harmonic of the magnetic resonance frequency of an atom of said material and modulated at a frequency which is a submultiple of the magnetic resonance frequency;

a transmitting antenna fed by said transmitter and carried by said housing and arranged for directing the transmitter wave into the earth;

a receiving antenna carried by said housing; and a receiver fed by said receiving antenna, said receiver including means for converting the received radio frequency signal to a signal for recording.

References Cited

UNITED STATES PATENTS

| 2,909,725 | 10/1959 | Bell | 324—.5 |
| 3,019,383 | 1/1962 | Varian | 324—.5 |
| 3,060,371 | 10/1962 | Townsend | 324—.5 |
| 3,068,399 | 12/1962 | Bloch | 324—.5 |
| 3,147,428 | 9/1964 | Anderson | 324—.5 |

RUDOLPH V. ROLINEC, *Primary Examiner.*

MICHAEL J. LYNCH, *Assistant Examiner.*